(12) United States Patent
Sabater et al.

(10) Patent No.: US 10,182,183 B2
(45) Date of Patent: Jan. 15, 2019

(54) METHOD FOR OBTAINING A REFOCUSED IMAGE FROM 4D RAW LIGHT FIELD DATA

(71) Applicant: THOMSON LICENSING, Issy les Moulineaux (FR)

(72) Inventors: Neus Sabater, Betton (FR); Benoit Vandame, Betton (FR); Matthieu Hog, Thorigné Fouillard (FR); Valter Drazic, Betton (FR)

(73) Assignee: Thomson Licensing, Issy-les-Moulineaux (FR)

( * ) Notice: Subject to any disclaimer, the term of this patent is extended or adjusted under 35 U.S.C. 154(b) by 31 days.

(21) Appl. No.: 15/168,032

(22) Filed: May 28, 2016

(65) Prior Publication Data
US 2016/0353007 A1    Dec. 1, 2016

(30) Foreign Application Priority Data

May 29, 2015  (EP) .................................. 15305816

(51) Int. Cl.
*H04N 5/232* (2006.01)
*G06T 5/00* (2006.01)
*G06T 5/50* (2006.01)
*H04N 5/225* (2006.01)

(52) U.S. Cl.
CPC ......... *H04N 5/23212* (2013.01); *G06T 5/003* (2013.01); *G06T 5/50* (2013.01); *H04N 5/2254* (2013.01); *H04N 5/23229* (2013.01); *G06T 2207/10052* (2013.01)

(58) Field of Classification Search
None
See application file for complete search history.

(56) References Cited

U.S. PATENT DOCUMENTS

| 7,965,936 | B2 | 6/2011 | Raskar et al. | |
| 8,315,476 | B1 | 11/2012 | Georgiev et al. | |
| 8,724,000 | B2 | 5/2014 | Georgiev et al. | |
| 2010/0265386 | A1 | 10/2010 | Raskar et al. | |
| 2013/0128068 | A1* | 5/2013 | Georgiev | H04N 5/23229 348/222.1 |

(Continued)

FOREIGN PATENT DOCUMENTS

| GB | 2488905 | 9/2012 |
| WO | WO2013167758 | 11/2013 |
| WO | WO2013180192 | 12/2013 |

OTHER PUBLICATIONS

Georgiev et al., "Superresolution with Plenoptic 2.0 Cameras", OSA Optics & Photonics Technical Digest, Fall 2009, pp. 1-3.

(Continued)

*Primary Examiner* — James Hannett
(74) *Attorney, Agent, or Firm* — Myers Wolin LLC

(57) ABSTRACT

A method for obtaining a refocused image from 4D raw light field data for a given focus plane value g is described. The method is executed by an electronic device and is remarkable in that it comprises determining at least one pixel value, for at least one color component, of the refocused image at coordinates $(k, l) \in N^2$. The at least one projected pixel value with coordinates comprised in a neighborhood of said coordinates (k, l), for the at least one color component is determined, weighted and updated.

15 Claims, 11 Drawing Sheets

(56) References Cited

U.S. PATENT DOCUMENTS

| | | | |
|---|---|---|---|
| 2013/0128087 A1* | 5/2013 | Georgiev | H04N 5/2254 348/307 |
| 2013/0258098 A1 | 10/2013 | Ikemoto | |
| 2014/0016827 A1 | 1/2014 | Yamamoto et al. | |
| 2014/0240578 A1* | 8/2014 | Fishman | H04N 5/23293 348/333.08 |
| 2016/0173844 A1* | 6/2016 | Knight | H04N 9/04 348/222.1 |

OTHER PUBLICATIONS

Georgiev et al., "Superresolution with Plenoptic Camera 2.0", Adobe Technical Report, Adobe Systems, Apr. 2009, pp. 1-9.

Dansereau et al., "Decoding, Calibration and Rectification for Lenselet-Based Plenoptic Cameras", IEEE Conference on Computer Vision and Pattern Recognition (CVPR), Portland, Oregon, USA, Jun. 23, 2013, pp. 1027-1034.

Fiss et al., "Refocusing Plenoptic Images using Depth-Adaptive Splatting", IEEE International Conference on Computational Photography (ICCP), Santa Clara, California, USA, May 2, 2014, pp. 1-9.

Ng, R., "Digital Light Field Photography", PhD Dissertation in Computer Science, Stanford University, Jul. 2006, pp. 1-203.

Wanner et al., "Generating EPI Representations of 4D Light Fields with a Single Lens Focused Plenoptic Camera", International Symposium on Visual Computing, Las Vegas, Nevada, USA, Sep. 26, 2011, pp. 90-101.

Bishop et al., "The Light Field Camera: Extended Depth of Field, Aliasing, and Superresolution", IEEE Transactions on Pattern Analysis and Machine Intelligence, vol. 34, No. 5, May 2012, pp. 972-986.

Dowski et al., "Extended depth of field through wave-front coding", Applied Optics, vol. 34, No. 11, Apr. 10, 1995, pp. 1859-1866.

Levin et al., "Image and Depth from a Conventional Camera with a Coded Aperture", ACM Transactions on Graphics, vol. 26, No. 3, Article 70, Jul. 2007, pp. 1-10.

Levin et al., "Understanding camera trade-offs through a Bayesian analysis of light field projections", 10th European Conference on Computer Vision, Marseille, France, Oct. 12, 2008, pp. 1-14.

Pertuz et al., "Analysis of focus measure operators for shape-from-focus", Pattern Recognition, vol. 46, No. 5, (2013), pp. 1415-1432.

Yu et al., "An Analysis of Color Demosaicing in Plenoptic Cameras", 2012 IEEE Conference on Computer Vision and Pattern Recognition (CVPR), Providence, Rhode Island, USA, Jun. 16, 2012, pp. 1-9.

Corresponding European Patent Application 16171605.5 Communication dated Oct. 22, 2018.

Neus Sabater et al., "Light-Field Demultiplexing and Disparity Estimation," hal-00925652, version 1—Jan. 8, 2014, Technicolor Research and Innovation, France.

* cited by examiner

US 10,182,183 B2

METHOD FOR OBTAINING A REFOCUSED IMAGE FROM 4D RAW LIGHT FIELD DATA

This application claims the benefit, under 35 U.S.C. § 119 of European Patent Application No. 15305816.9, filed May 29, 2015.

TECHNICAL FIELD

The disclosure relates to 4D light field data processing. More precisely, the disclosure relates to a technique for obtaining a 2D refocused image directly from 4D raw light field data, without performing a demultiplexing of 4D raw light field data (i.e. obtaining a refocused image without using sub-aperture images derived/obtained from 4D raw light field data).

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

The acquisition of 4D light-field data), which can be viewed as a sampling of a 4D light field (i.e. the recording of light rays as explained in FIG. 1 of the article: "*Understanding camera trade-offs through a Bayesian analysis of light field projections*" by Anat Levin et al., published in the conference proceedings of ECCV 2008) is an hectic research subject.

Indeed, compared to classical 2D images obtained from a camera, 4D light-field data enable a user to have access to more post processing features that enhance the rendering of images and/or the interactivity with the user. For example, with 4D light-field data, it is possible to perform with ease refocusing of images a posteriori (i.e. refocusing with freely selected distances of focalization meaning that the position of a focal plane can be specified/selected a posteriori), as well as changing slightly the point of view in the scene of an image. In order to acquire 4D light-field data, several techniques can be used. Especially, a plenoptic camera, as depicted in document WO 2013/180192 or in document GB 2488905, is able to acquire 4D light-field data. Details of the architecture of a plenoptic camera are provided in FIGS. 1, 2, 3, 4 and 5 of the present document.

In the state of the art, there are several ways to represent (or define) 4D light-field data. Indeed, in the Chapter 3.3 of the Phd dissertation thesis entitled "*Digital Light Field Photography*" by Ren Ng, published in July 2006, three different ways to represent 4D light-field data are described. Firstly, 4D light-field data can be represented, when recorded by a plenoptic camera as the one depicted in FIG. 1 for example, by a collection of micro-lens images (see the description of FIG. 2 in the present document). 4D light-field data in this representation are named raw images (or 4D raw light-field data). Secondly, 4D light-field data can be represented, by a set of sub-aperture images. A sub-aperture image corresponds to a captured image of a scene from a point of view, the point of view being slightly different between two sub-aperture images. These sub-aperture images give information about the parallax and depth of the imaged scene. Thirdly, 4D light-field data can be represented by a set of epipolar images (see for example the article entitled: "*Generating EPI Representation of a 4D Light Fields with a Single Lens Focused Plenoptic Camera*", by S. Wanner et al., published in the conference proceedings of ISVC 2011).

A common technique that is used to perform refocusing from 4D light-field data is based on the shift and addition of micro-lens images (i.e. directly from the 4D raw light-field data, note $I_{RAW}$) as explained in document WO 2013/167758 (in the section "image refocusing method"). The FIG. 6 of the present document roughly depicts how to project a pixel at coordinates (x, y) in said 4D raw light-field data for obtaining a 2D image. While 4D raw light-field pixels (i.e. the pixels of the micro-images) are projected into a refocused image, a weight-map records the number of accumulated projected pixels. The weight-map also records the interpolation in the case that projected coordinates are non-integer coordinates. Once all 4D raw light-field pixels are projected into the refocused image and the weight-map is determined, the refocused image is divided by the weight-map so that each refocused pixel received the same average contribution. The resulting 2D image can be output on a display, or stored and/or transmitted to another device for example.

In order to improve the quality (especially the sharpness) of the 2D refocused image, the technique described in the article entitled "*Refocusing Plenoptic Images using Depth-Adaptive Splatting*" by Juliet Fiss et al. can be used for interpolation purpose. Indeed, the interpolation based on this approach consists in spreading the influence of a 4D raw light-field pixel on the 2D refocused image (see the FIG. 5 of the article where a 4D raw light-field pixel at coordinates (x, y) is projected to a location s with a value defined as a function of a splat kernel). As mentioned in this article: "*Splatting can be viewed as a form of scattered data interpolation using radial basis functions*". However, one drawback of this approach is that 4D raw light-field data have to be demosaicked before projecting the 4D raw light-field pixels onto the 2D refocused image. Another drawback of this approach is that the splat kernel is isotropic in (x, y) and only depends on the depth of the scene. At last, another drawback of this approach is that the splat kernel does not take into account multi-focal plenoptic cameras (as for example the one depicted in the article entitled "*The Multi-Focus Plenoptic Camera*" by Todor Georgiev and Andrew Lumsdaine) or the geometry of the scene.

Therefore, there is a need to provide a technique that can overcome these drawbacks.

SUMMARY OF THE DISCLOSURE

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure is directed to a method for obtaining a refocused image from 4D raw light field data for a given focus plane value g. The method is executed by an electronic device and is remarkable in that it comprises determining at least one pixel value, for at least one color component, of said refocused image at coordinates (k, l)∈N², said determining comprising:
  obtaining at least one projected pixel value with coordinates comprised in a neighborhood of said coordinates (k, l), for said at least one color component;
  weighting said at least one projected pixel value based on a function, said weighting outputting a weighted value;
  updating said at least one pixel value, for said at least one color component, of said refocused image at coordinates (k, l) with said weighted value.

Hence, the present technique relates to a processing that is done to determine a pixel value in the refocused image, color component per color component. Hence, the present technique does not need to use demosaicing methods on 4D raw light field data, (more details on demosaicing methods can be found out in the article entitled "*An Analysis of Color Demosaicing in Plenoptic Cameras*" by Zhan Yu et al.). Therefore, the present technique enables the reduction of color artefacts in a refocused image. Indeed, once the present technique is applied for each color, the combining of refocused image (one per color component) is done in order to obtain a color image. There are no demosaicing methods used in the present technique.

In a preferred embodiment, the method for obtaining is remarkable in that said at least one projected pixel value has coordinates (X, Y), and said function is defined as being $$W_1(k, l, X, Y) = \exp\left(-\frac{\|(k, l) - (X, Y)\|^2}{h_1^2}\right),$$

where $h_1$ corresponds to a value that belongs to R, and function $\|.\|$ is a norm function.

In a preferred embodiment, the method for obtaining is remarkable in that said at least one projected pixel value has coordinates (X, Y), and said function is defined as being $$W_2(k, l, X, Y) = \exp\left(-\frac{(g - g_{real}(X, Y))^2}{h_2^2}\right),$$

where $h_2$ corresponds to a value that belongs to R, and value of $g_{real}(X, Y)$ corresponds to the real value of g in a scene associated with said 4D raw light field data. More precisely, $g_{real}(X, Y)$ corresponds to the real distance in a scene associated with said 4D raw light field data from a light field acquisition device that acquired said 4D raw light field data.

In a preferred embodiment, the method is remarkable in that said at least one projected pixel value has coordinates (X, Y), and said function is defined as being $$W_3(k, l, X, Y) = \exp\left(-\frac{(a(k-X) + b(l-Y))^2}{h_3^2}\right)\exp\left(-\frac{(c(k-X) + d(l-Y))^2}{h_3'^2}\right),$$

where $h_3$ and $h_3'$ correspond to a values that belong to R, and values a, b, c and d correspond to smoothing values determined according to tensor structure of said refocused image.

In a preferred embodiment, the method is remarkable in that said at least one projected pixel value has coordinates (X, Y), and said function is defined as being $W_6(k, l, X, Y) = \chi((k, l)$ belongs to the K—Nearest Neighbors pixels of ([X], [Y])), where $\chi(.)$ is the characteristic function which is equal to one if the statement is true and equal to zero otherwise, [.] is the rounding function, and K. is an integer greater or equal to 2.

In a preferred embodiment, the method is remarkable in that said at least one projected pixel value has coordinates (X, Y)=(s[g(x−$C_x$)+$C_x$], s[g(y−$C_y$)+$C_y$]), where, s defines the image size of the 2D refocused image, coordinates (x, y) correspond to coordinates of a pixel in said 4D raw light field data, coordinates ($C_x$, $C_y$) correspond to coordinates of a center of a micro-image to which pixel at coordinates (x, y) belongs to, and said function is defined as being $W_7(k, l, X, Y)$=PSF(x, y), where function PSF is an estimation of the Point Spread Function of a plenoptic camera.

In a preferred embodiment, the method is remarkable in that said at least one projected pixel value has coordinates (X, Y)=(s[g(x−$C_x$)+$C_x$], s[g(y−$C_y$)+$C_y$]), where, s defines the image size of the 2D refocused image, coordinates (x, y) correspond to coordinates of a pixel in said 4D raw light field data, coordinates ($C_x$, $C_y$) correspond to coordinates of a center of a micro-image to which pixel at coordinates (x, y) belongs to, and said function is defined as being $W_8 = \chi(\|(x, y) - (C_x, C_y)\|^2 < \rho)$, where $\chi(.)$ is the characteristic function which is equal to one if the statement is true and equal to zero otherwise, $\rho$ is a threshold value, and function $\|.\|$ is a norm function.

In a preferred embodiment, the method is remarkable in that said at least one projected pixel value has coordinates (X, Y)=(s[g(x−$C_x$)+$C_x$], s[g(y−$C_y$)+$C_y$]), where, s defines the image size of the 2D refocused image, coordinates (x, y) correspond to coordinates of a pixel in said 4D raw light field data, coordinates ($C_x$, $C_y$) correspond to coordinates of a center of a micro-image to which pixel at coordinates (x, y) belongs to, and said function is defined as being $$W_9(k, l, X, Y) = \exp\left(-\frac{\|(x, y) - (C_x, C_y)\|^2}{h_8^2}\right),$$

where $h_8$ corresponds to a value that belongs to R, and function $\|.\|$ is a norm function.

In a preferred embodiment, the method is remarkable in that said at least one projected pixel value has coordinates (X, Y)=(s[g(x−$C_x$)+$C_x$], s[g(y−$C_y$)+$C_y$]), where, s defines the image size of the 2D refocused image, coordinates (x, y) correspond to coordinates of a pixel in said 4D raw light field data, coordinates ($C_x$, $C_y$) corresponds to coordinates of a center of a micro-image to which pixel at coordinates (x, y) belongs to, and said function is defined as being equal to $$W_4(k, l, X, Y) = \frac{1}{|S(x, y) - S_{max}|} W_i$$

with i≠4, where S(x, y) is a measure of sharpness of the microlens to which (x, y) belong and $S_{max}$ corresponds to a maximum sharpness value over all microlenses of said 4D raw light field data.

In a preferred embodiment, the method is remarkable in that said function is defined as being separable.

In a preferred embodiment, the method is remarkable in that said function is defined as being a product of $$W_1(k, l, X, Y) = \exp\left(-\frac{\|(k, l) - (X, Y)\|^2}{h_1^2}\right),$$

where $h_1$ corresponds to a value that belongs to R, function $\|.\|$ is a norm function, with another function.

In a preferred embodiment, the method is remarkable in that said updating comprises adding said weighted value to said at least one pixel value.

In one embodiment, there is an initialization of said at least one pixel value. For example, the initialization of said at least one pixel value can comprise the initialization to a null value in a register in the electronic device.

According to an exemplary implementation, the different steps of the method are implemented by a computer software program or programs, this software program comprising software instructions designed to be executed by a data processor of a relay module according to the disclosure and being designed to control the execution of the different steps of this method.

Consequently, an aspect of the disclosure also concerns a program liable to be executed by a computer or by a data processor, this program comprising instructions to command the execution of the steps of a method as mentioned here above.

This program can use any programming language whatsoever and be in the form of a source code, object code or code that is intermediate between source code and object code, such as in a partially compiled form or in any other desirable form.

The disclosure also concerns an information medium readable by a data processor and comprising instructions of a program as mentioned here above.

The information medium can be any entity or device capable of storing the program. For example, the medium can comprise a storage means such as a ROM (which stands for "Read Only Memory"), for example a CD-ROM (which stands for "Compact Disc-Read Only Memory") or a microelectronic circuit ROM or again a magnetic recording means, for example a floppy disk or a hard disk drive.

Furthermore, the information medium may be a transmissible carrier such as an electrical or optical signal that can be conveyed through an electrical or optical cable, by radio or by other means. The program can be especially downloaded into an Internet-type network.

Alternately, the information medium can be an integrated circuit into which the program is incorporated, the circuit being adapted to executing or being used in the execution of the method in question.

According to one embodiment, an embodiment of the disclosure is implemented by means of software and/or hardware components. From this viewpoint, the term "module" can correspond in this document both to a software component and to a hardware component or to a set of hardware and software components.

A software component corresponds to one or more computer programs, one or more sub-programs of a program, or more generally to any element of a program or a software program capable of implementing a function or a set of functions according to what is described here below for the module concerned. One such software component is executed by a data processor of a physical entity (terminal, server, etc.) and is capable of accessing the hardware resources of this physical entity (memories, recording media, communications buses, input/output electronic boards, user interfaces, etc.).

Similarly, a hardware component corresponds to any element of a hardware unit capable of implementing a function or a set of functions according to what is described here below for the module concerned. It may be a programmable hardware component or a component with an integrated circuit for the execution of software, for example an integrated circuit, a smart card, a memory card, an electronic board for executing firmware etc. In a variant, the hardware component comprises a processor that is an integrated circuit such as a central processing unit, and/or a microprocessor, and/or an Application-specific integrated circuit (ASIC), and/or an Application-specific instruction-set processor (ASIP), and/or a graphics processing unit (GPU), and/or a physics processing unit (PPU), and/or a digital signal processor (DSP), and/or an image processor, and/or a coprocessor, and/or a floating-point unit, and/or a network processor, and/or an audio processor, and/or a multi-core processor. Moreover, the hardware component can also comprise a baseband processor (comprising for example memory units, and a firmware) and/or radio electronic circuits (that can comprise antennas) which receive or transmit radio signals. In one embodiment, the hardware component is compliant with one or more standards such as ISO/IEC 18092/ECMA-340, ISO/IEC 21481/ECMA-352, GSMA, StoLPaN, ETSI/SCP (Smart Card Platform), GlobalPlatform (i.e. a secure element). In a variant, the hardware component is a Radio-frequency identification (RFID) tag. In one embodiment, a hardware component comprises circuits that enable Bluetooth communications, and/or Wi-fi communications, and/or Zigbee communications, and/or USB communications and/or Firewire communications and/or NFC (for Near Field) communications.

It should also be noted that a step of obtaining an element/value in the present document can be viewed either as a step of reading such element/value in a memory unit of an electronic device or a step of receiving such element/value from another electronic device via communication means.

In another embodiment, it is proposed an electronic device for obtaining a refocused image from 4D raw light field data for a given focus plane value g. The electronic device is remarkable in that it comprises a circuit configured to determine at least one pixel value, for at least one color component, of said refocused image at coordinates (k, l)∈$N^2$, said circuit comprising:
- an obtaining circuit configured to obtain at least one projected pixel value with coordinates comprised in a neighborhood of said coordinates (k, l), for said at least one color component;
- a weighting circuit configured to weight said at least one projected pixel value based on a function, said weighting circuit outputting a weighted value;
- an updating circuit configured to update said at least one pixel value, for said at least one color component, of said refocused image at coordinates (k, l) with said weighted value.

In a preferred embodiment, the electronic device is remarkable in that said at least one projected pixel value has coordinates (X, Y), and said function is defined as being $$W_1(k, l, X, Y) = \exp\left(-\frac{\|(k, l) - (X, Y)\|^2}{h_1^2}\right),$$

where $h_1$ corresponds to a value that belongs to R, and function $\|.\|$ is a norm function.

BRIEF DESCRIPTION OF THE DRAWINGS

The above and other aspects of the invention will become more apparent by the following detailed description of exemplary embodiments thereof with reference to the attached drawings in which.

DETAILED DESCRIPTION

Figure 1:
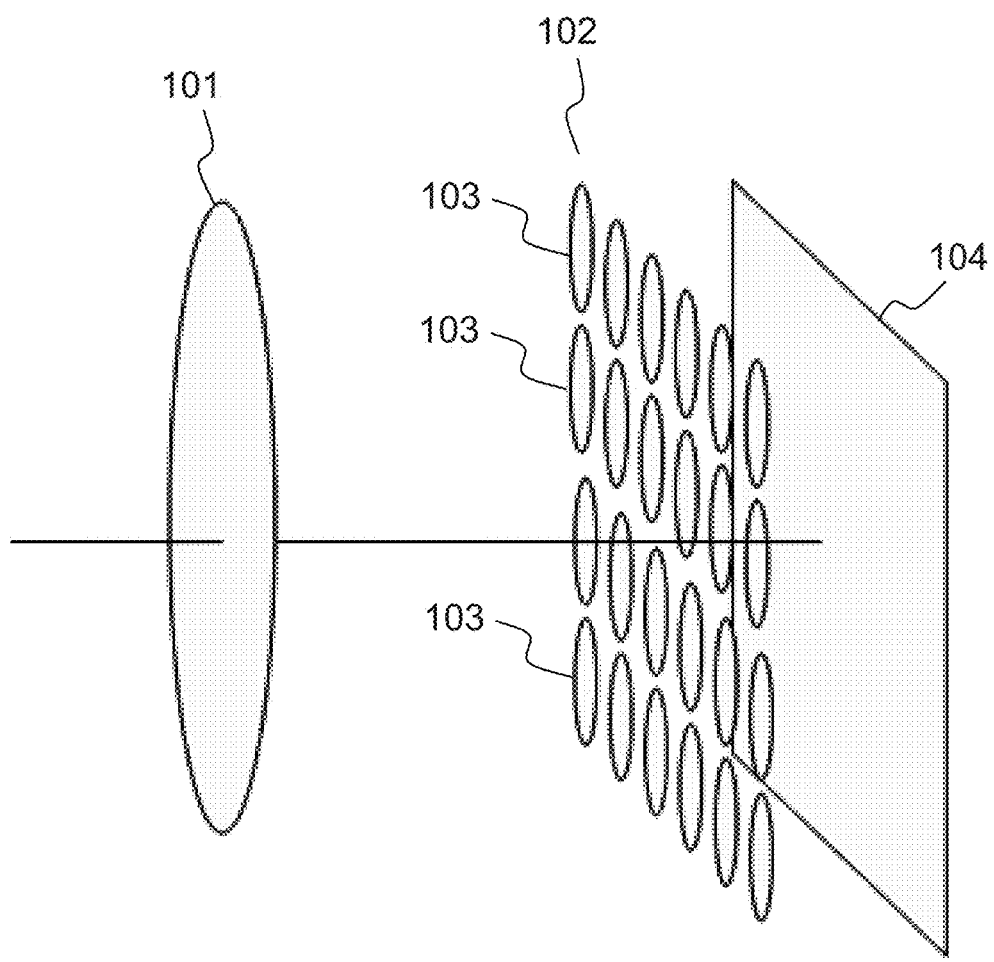
FIG. 1 shows schematically the main components comprised in a plenoptic camera that enables the acquisition of light field data on which the present technique can be applied.

FIG. 1 present schematically the main components comprised in a plenoptic camera that enables the acquisition of light field data on which the present technique can be applied.

More precisely, a plenoptic camera comprises a main lens referenced 101, and a sensor array (i.e. an array of pixel sensors (for example a sensor based on CMOS technology)), referenced 104. Between the main lens 101 and the sensor array 104, a microlens array referenced 102, that comprises a set of micro lenses referenced 103, is positioned. It should be noted that optionally some spacers might be located between the micro-lens array around each lens and the sensor to prevent light from one lens to overlap with the light of other lenses at the sensor side. It should be noted that the main lens 101 can be a more complex optical system as the one depicted in FIG. 1 (as for example the optical system described in FIGS. 12 and 13 of document GB2488905) Hence, a plenoptic camera can be viewed as a conventional camera plus a micro-lens array set just in front of the sensor as illustrated in FIG. 1. The light rays passing through a micro-lens cover a part of the sensor array that records the radiance of these light rays. The recording by this part of the sensor defines a micro-lens image.

Figure 2:
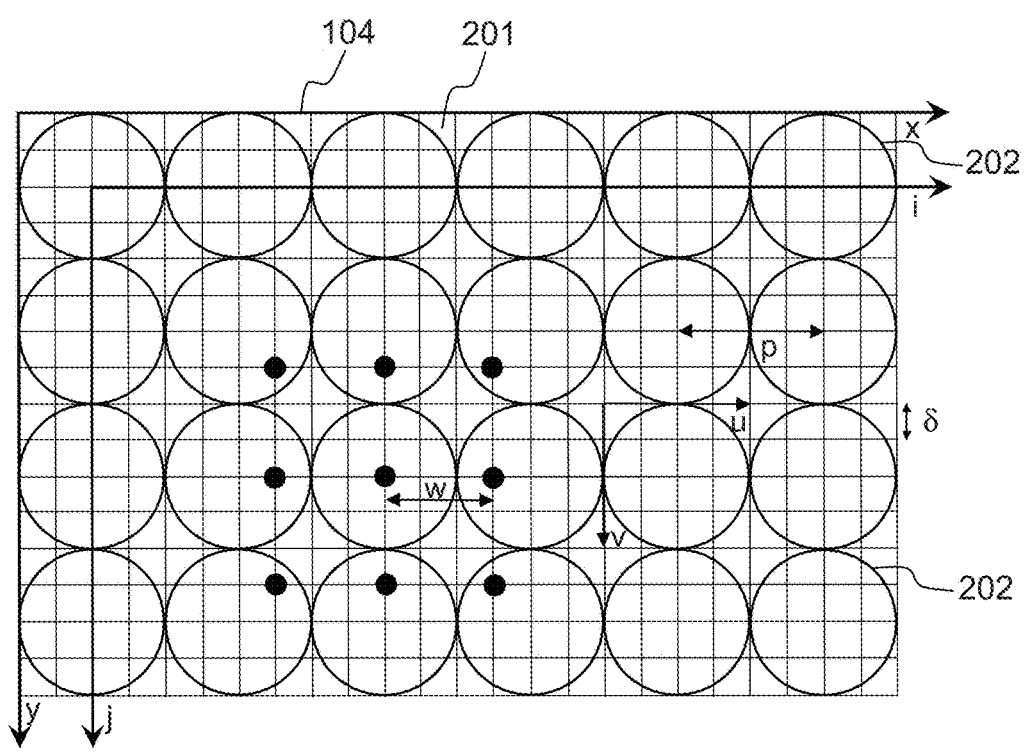
FIG. 2 shows an image captured by a sensor array of FIG. 1.

FIG. 2 present an image captured by the sensor array 104. Indeed, in such view, it appears that the sensor array 104 comprises a set of pixels, referenced 201. The light rays passing through a micro-lens cover a number of pixels 201, and these pixels record the energy value of light rays that are incident/received.

Hence the sensor array 104 of a plenoptic camera records an image which comprises a collection of 2D small images (i.e. the micro-lens images referenced 202) arranged within a 2D image (which is also named a raw 4D light-field image). Indeed, each small image (i.e. the micro-lens images) is produced by a micro-lens (the micro-lens can be identified by coordinates (i, j) from the array of lens). Hence, the pixels of the light-field are associated with 4 coordinates (x, y, i, j). L(x, y, i, j) being the 4D light-field recorded by the sensor illustrates the image which is recorded by the sensor. Each micro-lens produces a micro-image represented by a circle (the shape of the small image depends on the shape of the micro-lenses which is typically circular). Pixel coordinates (in the sensor array) are labelled (x, y). p is the distance between two consecutive micro-images, p is not necessary an integer value. Micro-lenses are chosen such that p is larger than a pixel size δ. Micro-lens images are referenced by their coordinates (i, j). Each micro-lens image samples the pupil of the main-lens with the (u, v) coordinate system. Some pixels might not receive any photons from any micro-lens especially if the shape of the micro-lenses is circular. In this case, the inter micro-lens space is masked out to prevent photons to pass outside from a micro-lens, resulting in some dark areas in the micro-images. If the micro-lenses have a square shape, no masking is needed). The center of a micro-lens image (i, j) is located on the sensor at the coordinates $(x_{i,j}, y_{i,j})$. θ is the angle between the square lattice of pixel and the square lattice of micro-lenses, in FIG. 2 θ=0. Assuming the micro-lenses are arranged according to a regular square lattice, the $(x_{i,j}, y_{i,j})$ can be computed by the following equation considering $(x_{0,0}, y_{0,0})$ the pixel coordinates of the micro-lens image (0, 0):

$$\begin{bmatrix} x_{i,j} \\ y_{i,j} \end{bmatrix} = p \begin{bmatrix} \cos\theta & -\sin\theta \\ \sin\theta & \cos\theta \end{bmatrix} \begin{bmatrix} i \\ j \end{bmatrix} + \begin{bmatrix} x_{0,0} \\ y_{0,0} \end{bmatrix}$$

FIG. 2 also illustrates that an object from the scene is visible on several contiguous micro-lens images (dark dots). The distance between 2 consecutive views of an object is w, this distance is named the replication distance. Hence, an object is visible on r consecutive micro-lens images with:

$$r = \left\lfloor \frac{p}{|p-w|} \right\rfloor$$

r is the number of consecutive micro-lens images in one dimension. An object is visible in $r^2$ micro-lens images. Depending on the shape of the micro-lens image, some of the $r^2$ views of the object might be invisible.

More details related to plenoptic camera can be found out in the Section 4 entitled "Image formation of a Light field camera" in the article entitled "*The Light Field Camera: Extended Depth of Field, Aliasing, and Superresolution*" by Tom E. Bishop and Paolo Favaro, published in the IEEE Transactions on Pattern Analysis and Machine Intelligence, Vol. 34, No 5, in May 2012.

It should be noted that the present technique can also be applied on "conventional camera" (in the sense that no additional micro-lens array is positioned between the main lens and array of pixels), in the case that at least a part of the pixels of such conventional camera are designed in the same way (or similar way) as the one described in the document US2013258098. Indeed, document US2013258098 discloses a pixel that can record light field data due to the use of several light receiving sections (for example referenced 116 and 117 in document US2013258098). Hence, one skilled in the art could assimilate such conventional camera with an array of pixels integrating the technique of document US2013258098 as a kind of plenoptic camera as depicted in FIG. 1, in which each micro-lens concentrates light rays on two pixels comprised in the sensor 104. It should be noted that technique of document US2013258098 can be generalized in the sense that a pixel can record more than two data information (obtained by the two low and high receiving sections), if more receiving section are integrated in the architecture of a pixel. The present disclosure can be used on raw images of "conventional camera" integrating pixels that can record light field data as mentioned previously. Indeed, these raw images can be assimilated to a set of micro-lens images.

It should also be noted that the present disclosure can also be applied to other devices that acquire 4D light field data such as devices that comprise coded aperture elements as depicted in document US 2010/0265386, or in the article entitled "*Image and depth from a conventional camera with a coded aperture*" by A. Levin a al., published in the proceedings of SIGGRAPH 2007, or use wavefront coding techniques as mentioned in the article entitled "Extended depth of field through wave-front coding" by Edward R. Dowski, Jr., and W. Thomas Cathe, published in Applied Optics, 1995 Apr. 10.

Figure 3:
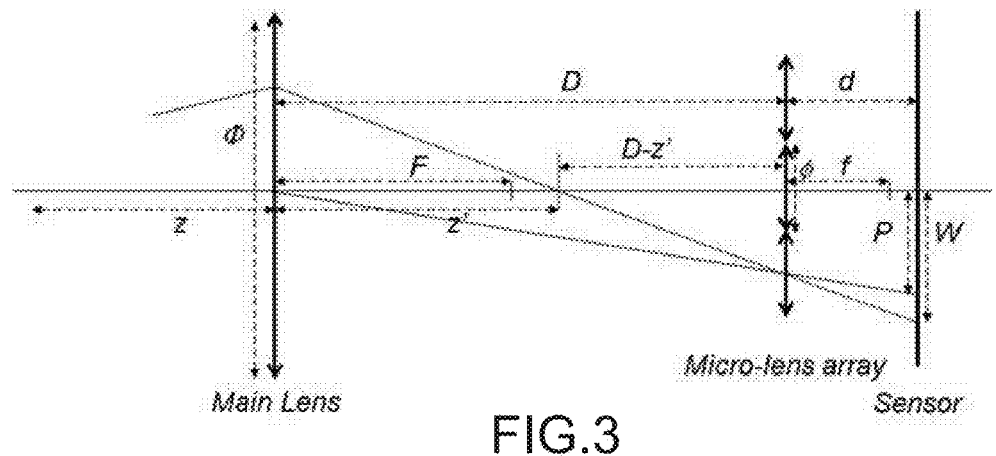
FIG. 3 illustrates a schematic plenoptic type II camera assuming perfect thin lens model.
Figure 4:
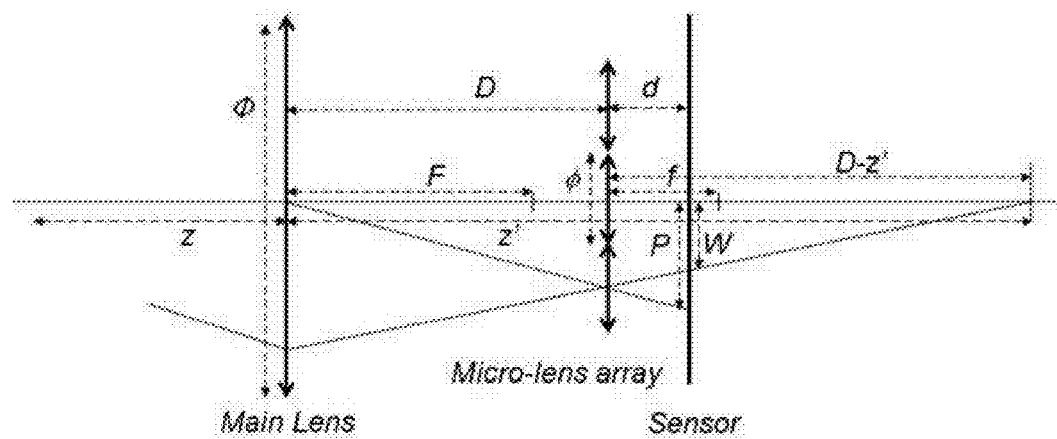
FIG. 4 illustrates another schematic plenoptic type II camera assuming perfect thin lens model.

FIG. 3 and FIG. 4 illustrate a schematic plenoptic type II camera assuming perfect thin lens model. The distances p and w introduced previously are given in unit of pixel. They are converted into physical unit distance (meters) respectively P and W by multiplying them by the pixel size δ: W=δ·w and P=δ·p. These distances depends on the light-field camera characteristics.

The main-lens has a focal length F and an aperture Φ. The micro-lens array is made of micro-lenses having a focal length f. The pitch of the micro-lens array is φ. The micro-lens array is located at a distance D from the main-lens, and a distance d from the sensor. The object (not visible on the figures) is located at a distance z from the main-lens (left). This object is focused by the main-lens at a distance z' from the main-lens (right).

FIG. 3 and FIG. 4 illustrate the cases where respectively D>z' and D<z'. In both cases, micro-lens images can be in focus depending on d and f. This design refers to the so-called type II plenoptic camera (also named plenoptic camera 2.0).

Figure 5:
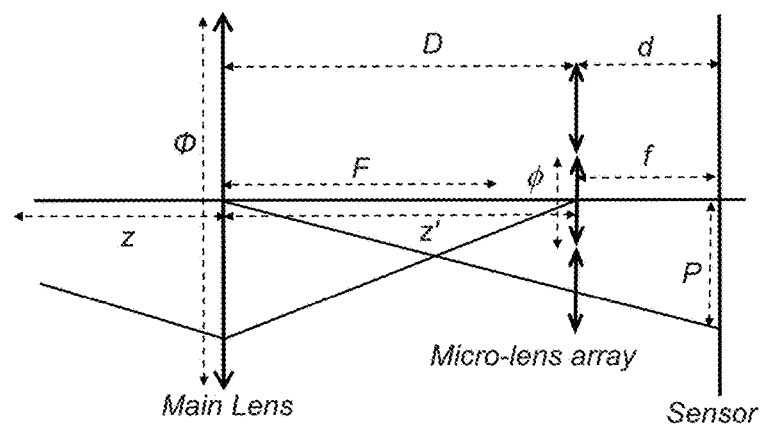
FIG. 5 illustrates a type I plenoptic camera.

FIG. 5 presents a type I plenoptic camera (also named plenoptic camera 1.0), in which f=d.

In FIG. 5, the design is made such that the main-lens is focusing images close to the micro-lens array. If the main-lens is focusing exactly on the micro-lens array, then W=∞. Also the micro-lens images are fully out-of-focus and equal to a constant (not considering noise).

The replication distance W varies with the z the distance of the object. To establish the relation between W and z, one relies on the thin lens equation:

$$\frac{1}{z} + \frac{1}{z'} = \frac{1}{F}$$

And the Thales law:

$$\frac{D-z'}{\phi} = \frac{D-z'+d}{W}$$

Mixing the 2 previous equations on deduces:

$$W = \phi\left(1 + \frac{d}{D - \frac{zF}{z-F}}\right)$$

The relation between W and z does not assume that the micro-lens images are in focus. Micro-lens images are strictly in focus according to the thin lens equation:

$$\frac{1}{D-z'} + \frac{1}{d} = \frac{1}{f}$$

Also from the Thales law one derives P $$e = \frac{D+d}{D}$$

$$P = \phi e$$

The ratio e defines the enlargement between the micro-lens pitch and the micro-lens images pitch. This ratio is very close to 1 since D>>d.

Similar remarks can be found out in document WO 2013/167758.

Figure 6:
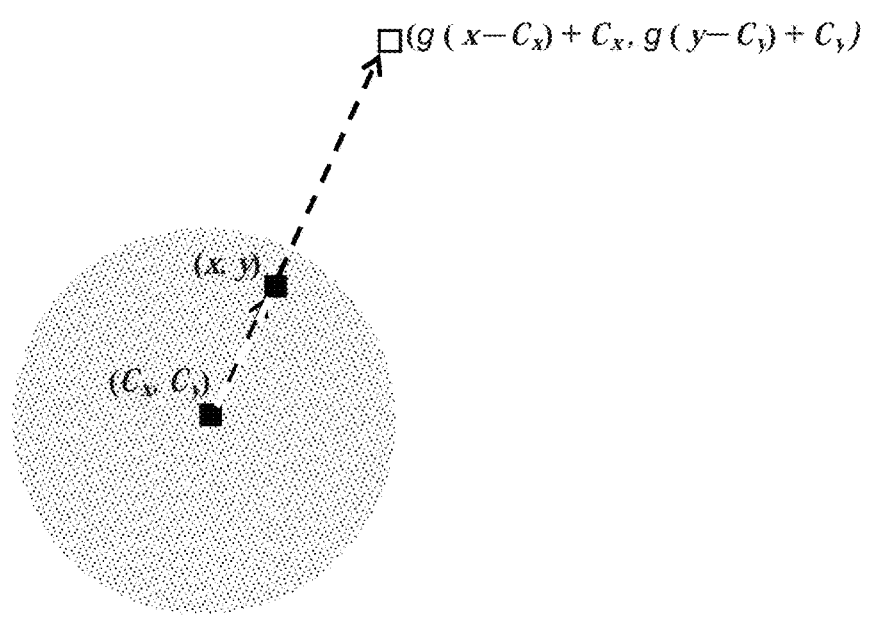
FIG. 6 shows a projection of a 4D raw light field pixel.

The FIG. 6 presents a projection of a 4D raw light field pixel (i.e. the pixel at coordinates (x, y), belonging to a microlens image referenced 600, having a center at coordinates ($C_x$, $C_y$)) onto a pixel (in a 2D refocused image) at coordinates (X, Y)=(s[g(x−$C_x$)+$C_x$], s[g(y−$C_y$)+$C_y$]) where g determines the refocus plane, s defines the image size of the 2D refocused image (hence size ($I_g$)=s·size($I_{RAW}$) where $I_g$. corresponds to the 2D refocused image). In the example of FIG. 6, we have s=1. More details on the refocusing process are detailed in document WO 2013/167758.

Hence, given a fixed image size s, and a focus plane g, the refocused image $I_g$ is estimated projecting all the pixels (x, y) of the 4D raw light field data $I_{RAW}$. It should be noted that projected coordinates (X, Y) are not necessarily located on uniformly distributed grid or on a regular grid. Indeed, the distribution on the image plane of real valued positions (X, Y) depends highly on the value g.

It should be noted that we assume that microlens centers of images ($C_x$, $C_y$) are estimated by any technique of the state-of-the-art (as the one described in the article entitled "*Decoding, calibration and rectification for lenselet-based plenoptic cameras.*" by Dansereau et al., published in the conference proceedings of Computer Vision and Pattern Recognition (CVPR), 2013 IEEE Conference on. IEEE).

The proposed technique relates to a method for obtaining a refocused image from a 4D raw light field data for a given focus (based on the value of g) that comprises determining a value of a pixel in the refocused image at the position (k, l)∈N², via the determining of a weighted sum of the pixel values projected in a neighborhood of (k, l). Therefore, the refocused image is defined as follows:

$$I_g^c(k, l) = \frac{1}{Z_{kl}} \sum_{(X,Y) \in B_{kl}} W(k, l, X, Y) I_{RAW}^c(x, y)$$

where $Z_{kl} = \Sigma_{(X,Y) \in B_{kl}} W(k, l, X, Y)$ is the normalization factor, $B_{kl}$ is a neighborhood centered at (k, l), and position (X, Y)=(s[g(x−$C_x$)+$C_x$], s[g(y−$C_y$)+$C_y$]), and c={R, G, B} is the color channel (where R is the red color, G is the green color, and B is the blue color). It should be noted that $I_p$ has a Bayer pattern, so $I_{RAW}^c(x, y)$ is non zero for only one color channel.

Figure 7A:
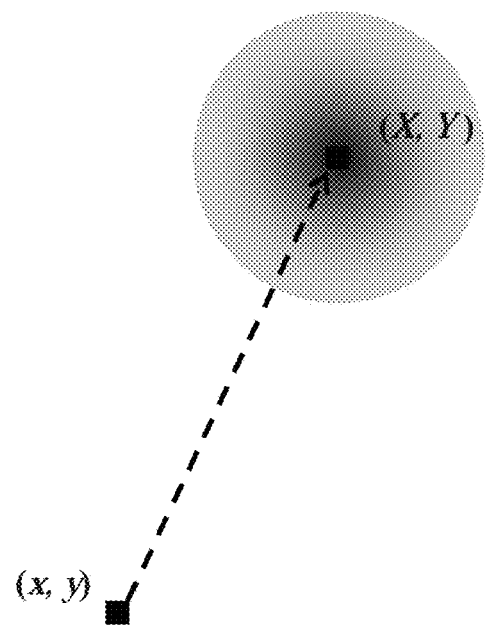
FIG. 7(a) illustrates a splatting process in which intensity values are projected at the refocusing plane and spread (splatted) around position (X, Y)
Figure 7B:
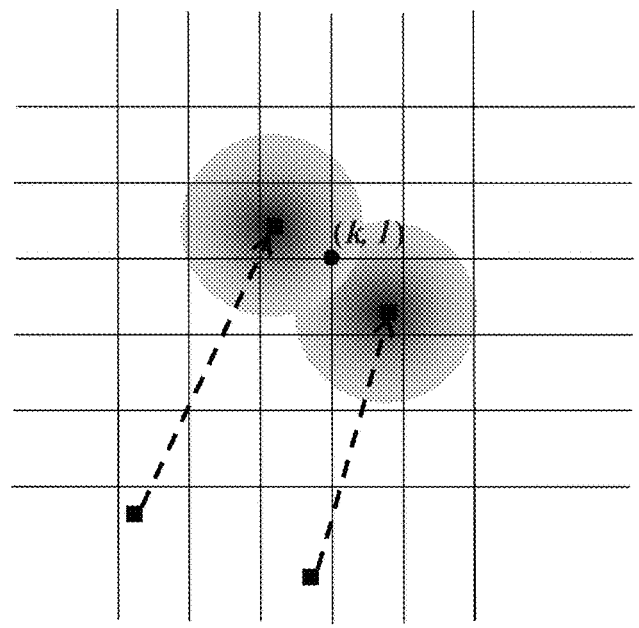
FIG. 7(b) shows that the (weighted) sum of all received pixel values at position (X, Y) are determined.

The FIGS. 7(a) and 7(b) illustrate a splatting process according to one embodiment of the disclosure. Note that with this definition, the splat kernel regulates the amount of blur. The bigger the kernel is, the blurrier the 2D refocused image is.

FIG. 7(a) illustrates that intensity values $I_{RAW}^c(x, y)$ are projected at the refocusing plane and spread (splatted) around position (X, Y). The spread values are weighted by the splat kernel W, meaning that not all pixels around (X, Y) receive the same pixel value.

FIG. 7(b) shows that in order to render the refocused image, for each pixel position of the image grid (k, l), the (weighted) sum of all received pixel values at this position are determined. In this example, pixel (k, l) receives two values. For illustration purposes, the shape of the splatting kernel is round in this figure but other shapes are possible.

Figure 7C:
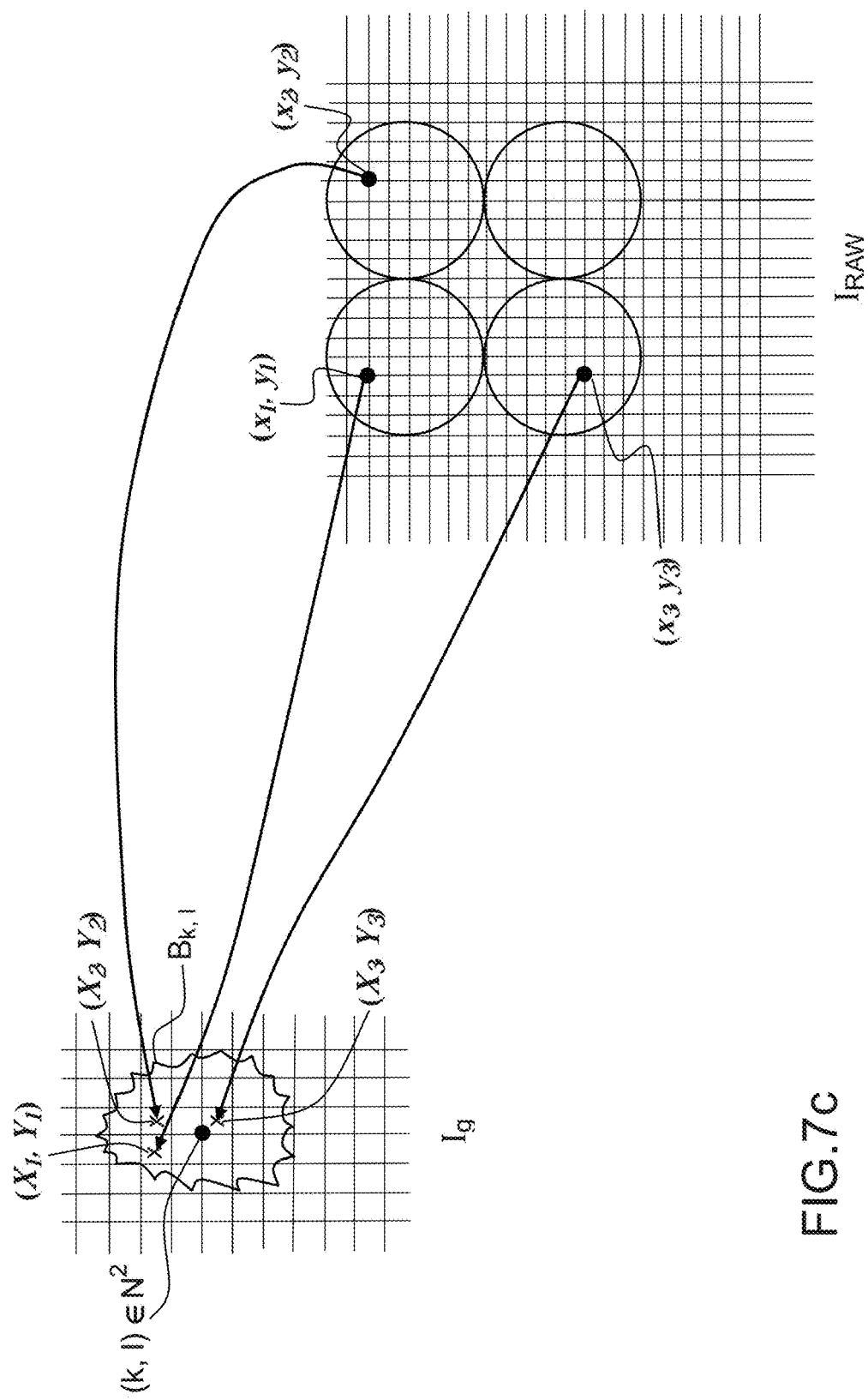
FIG. 7(c) illustrates an example of the determination of a value of a pixel in the refocused image at the position $(k, l) \in \mathbb{N}^2$.

FIG. 7(c) presents an example of the determination of a value of a pixel in the refocused image at the position (k, l)∈N². In a first step a neighborhood $B_{kl}$ of the pixel located at coordinates (k, l)∈N² is chosen. In an embodiment of the disclosure, such neighborhood can be centered on coordinates (k, l)∈N². In a variant, such neighborhood is not centered on coordinates (k, l)∈N², but the neighborhood area comprises the coordinates (k, l)∈N². The geometry of the neighborhood can be varied (from a circle to more complex geometry structure as the one depicted in FIG. 7(c). In the example of FIG. 7(c), only three pixels from the 4D raw light field data $I_{RAW}$ with a red color component have a projection in the neighborhood $B_{kl}$. Therefore, in one embodiment we have, for the red color component $I_g^c(k, l)$=[$W^{(1)}$(k, l, $X_1$, $Y_1$)$I_{RAW}^c(x_1, y_1)$+$W^{(2)}$(k, l, $X_2$, $Y_2$)$I_{RAW}^c(x_2, y_2)$+$W^{(3)}$(k, l, $X_3$, $Y_3$)$I_{RAW}^c(X_3, y_3)$]*normalization coefficient.

In this equation, the weight functions (also named spat kernels) $W^{(1)}$, $W^{(2)}$ and $W^{(3)}$ can be the same functions or different functions.

For the same neighborhood, but for another color component, other projected pixels are comprised in this neighborhood. Now, let us describe each of the possible definitions of the splat kernel W. The simplest definition of W is a circle of fixed radius r, that we will call $W_0$ in this document. Nevertheless, such a simple splat kernel is not going to recover nicely the refocused images.

In a first embodiment of the disclosure, the splat kernel W is a decreasing function with respect to ‖(k, l)−(X, Y)‖², meaning that W(X, Y, X, Y) reaches its maximum value and then it decreases proportionally as ‖(k, l)−(X, Y)‖² increases. An example of such a splat kernel is defined as $$W_1(k, l, X, Y) = \exp\left(-\frac{\|(k, l) - (X, Y)\|^2}{h_1^2}\right)$$

The value $h_1$ is a parameter that can be either inputted by a user or defined as a function of the parameters of the light field device that performed the acquiring of the 4D raw light field data.

In a second embodiment of the disclosure, assuming we know for each point (x, y) the value of $f_{real}$(x, y), the real value of g (i.e. the real distance in the scene from the light field acquisition device). This is, the plane at which the point (x, y) is supposed to be in focus (this can be estimated knowing the depth of the scene). Then, the splat kernel can be adapted at each point depending on $g_{real}$. Let g be the desired focal plane at which we aim to refocus the image. We define the splat kernel to be a decreasing function when |g−$g_{real}$| decreases. With this definition, points at the refocused plane g remain sharp, while other points are blurry and the amount of blurriness is proportional to the distance to the focal plane g. An example of such a splat kernel is given by $$W_2(k, l, X, Y) = \exp\left(-\frac{(g - g_{real}(X, Y))^2}{h_2^2}\right)$$

The value $h_2$ is a parameter that can be either inputted by a user or defined as a function of the parameters of the light field device that performed the acquiring of the 4D raw light field data.

Figure 8A:
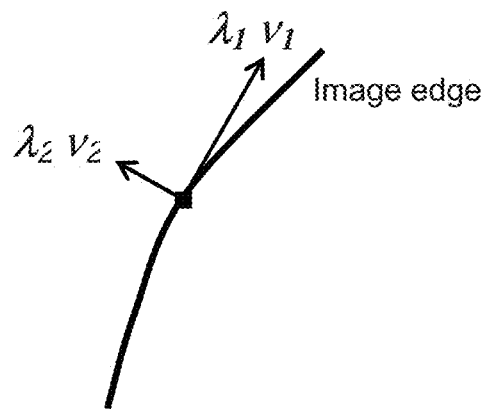
FIG. 8(a) illustrates the example of an image border where the tangent and normal vectors are estimated with the eigenvectors and eigenvalues of the tensor matrix computed at the black point.
Figure 8B:
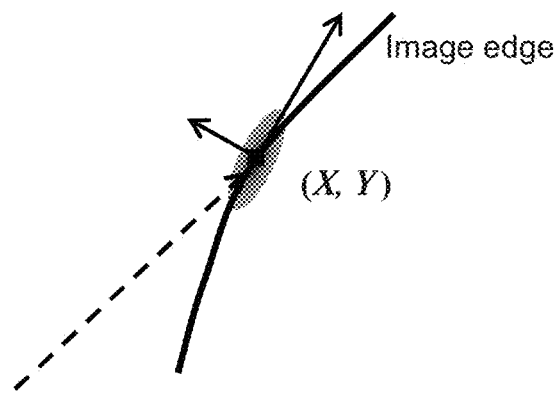
FIG. 8(b) illustrates tensor analysis defining the splat kernel such that its shape is adaptive when there is an image edge

In a third embodiment of the disclosure, the structure and geometry of the image (image borders) is an important information that can be exploited by the splat kernel. Given an image edge the splat kernel adapts its shape to the image border. In this case the splat kernel is anisotropic and adapts itself to the edges of the image. For instance, it is known that the tensor structure of an image defined as $$T(x, y) = \begin{pmatrix} R_x^2 + G_x^2 + B_x^2 & R_x R_y + G_x G_y + B_x B_y \\ R_x R_y + G_x G_y + B_x B_y & R_y^2 + G_y^2 + B_y^2 \end{pmatrix}$$

where $I_x$, $I_y$ are the partial derivatives of image I, provides important information about the local geometry of the image: the eigenvectors $v_1$, $v_2$ provide the principal directions of the image gradients (direction of the tangent vector and the normal vector) and the corresponding eigenvalues $\lambda_1$, $\lambda_2$ provide the magnitude of each principal direction. In particular the eigenvectors characterize the local geometry of the scene ($\lambda_1$, $\lambda_2$ small corresponds to a homogeneous area, $\lambda_1$, $\lambda_2$ large corresponds to an image corner, and $\lambda_1$ large and $\lambda_2$ small corresponds to an image edge with tangent $v_1$). FIG. 8(a) illustrates the case of an image border where the tangent and normal vectors are estimated with the eigenvectors and eigenvalues of the tensor matrix computed at the black point. Thanks to the tensor analysis, we can define the splat kernel such that its shape its adaptive when there is an image edge (see the FIG. 8(b)).

An example of splat kernel that takes into account the geometry of the image provided by the tensor structure is defined as $$W_3(k, l, X, Y) = \exp\left(-\frac{(a(k-X)+b(l-Y))^2}{h_3^2}\right)\exp\left(-\frac{(c(k-X)+d(l-Y))^2}{h_3'^2}\right)$$

This Gaussian kernel smoothes with value $h_3$ in the direction $(a, b)^{Tdef} \triangleq v_1$ and smoothes with value $h_3'$ in the direction $(c, d)^{Tdef} \triangleq v_2$.

The values $h_3$ and $h'_3$ are parameters that can be either inputted by a user or defined as a function of the parameters of the light field device that performed the acquiring of the 4D raw light field data.

Note that in practice, estimating the tensor of the refocused image is not easy due to the irregular sampling of the projected points $(X, Y)$. However, the tensor is a local operator and it can be estimated in the RAW image and then projected the same way as the image color values.

Figure 9A:
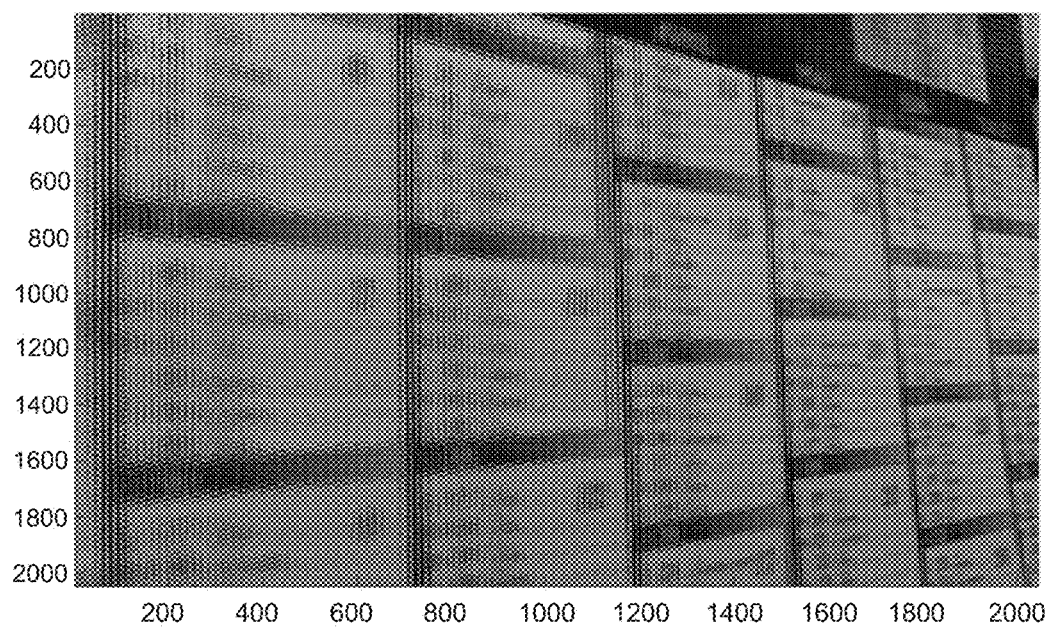
FIG. 9(a) shows 4D raw light field data captured with a Raytrix R5 camera.

In a fourth embodiment, the splat kernel takes into account the microlens type in a multi-focus plenoptic camera. For example the Raytrix camera is a plenoptic camera in which there are three types of microlenses with three different focal lengths. FIG. 9(a) shows 4D raw light field data captured with a Raytrix R5 camera.

Figure 9B:
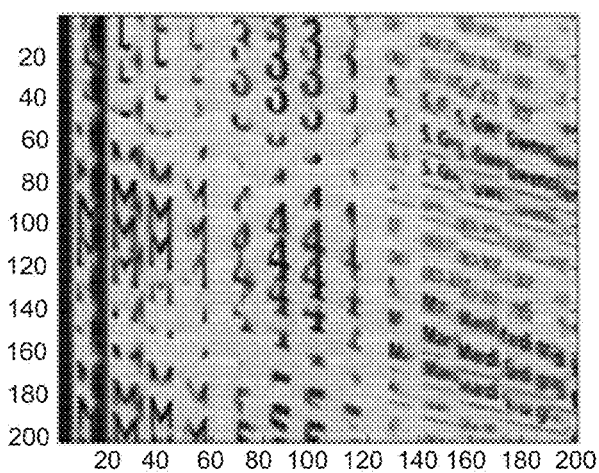
FIG. 9(b) presents three different crops of different parts of the same image. Notice that the micro lens array is formed by three different types of microlenses in term of focal length.
Figure 9B:
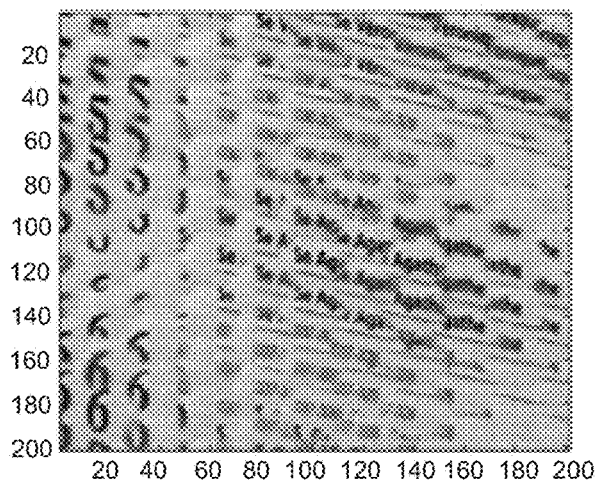
Figure 9B:
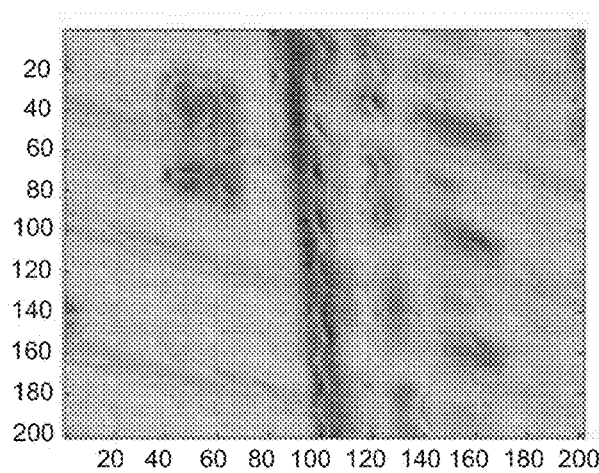

FIG. 9(b) presents three different crops of different parts of the same image. Notice that the micro lens array is formed by three different types of microlenses in term of focal length. So, different microlenses have different parts of the scene in focus. The left crop does not have the same microlenses in focus than the crop in the middle. The last crop shows a part of the scene where the three microlenses are out of focus.

In this embodiment, we consider the fact that our splat kernel varies according to the value to be splatted. If such a value comes from a microlens in focus, the splat kernel should have a major weight than a splat kernel spreading values of a microlens not in focus. The idea is to penalize not in focus microlenses over focused ones. An example of such a splat kernel is defined as:

$$W_4(k, l, X, Y) = \frac{1}{|S(x, y) - S_{max}|} W_i$$

where $W_{i \neq 4}$ is any of the splat kernels defined in this document, $S(x, y)$ is a measure of sharpness of the microlens to which $(x, y)$ belong and $S_{max}$ the maximum sharpness value over all microlenses of the raw image. Several sharpness measures could be used. For example, the sharpness measures defined in the article entitled: "*Analysis of focus measure operators for shape-from-focus*" by Pertuz, Said et al., published in Pattern Recognition 46.5 (2013): 1415-1432.

In a fifth embodiment of the disclosure, given an image size s and a desired refocus plane g, the distribution of the projected points $(X, Y)$ in the refocused plane is determined. While s only accounts for the scale, the choice of g changes the distribution itself.

In the present technique, the splat kernel takes into account this distribution such that the rendering process of the 2D refocused image does not produce color "holes". In other words, the present technique guarantees that each pixel position $(k, l)$ of the 2D refocused image $I_g$, has got during the splatting process at least one intensity value of each color.

In practice, this means that the support of the splat kernel has a minimum size given by a maximum sampling step H.

An example of such a splat kernel is $W_5 = W_0$ where the circle has radius $r = H$.

Figure 10:
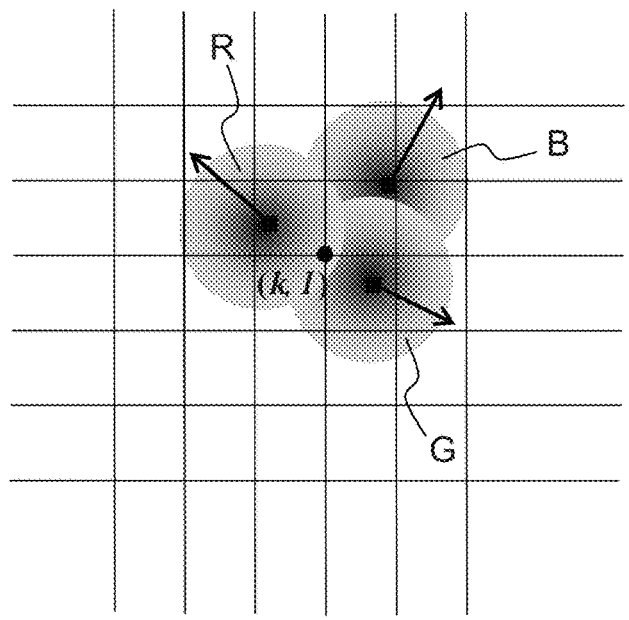
FIG. 10 presents a projected pixel, the projected pixel having coordinates (k, l) where at least one value per color channel is received.

The FIG. 10 presents a pixel position $(k, l)$ that receives at least one value per color channel. Splat kernels can have different shapes and sizes as soon as the minimal size (necessary to not create "holes") is guaranteed.

All the previous definitions of the splat kernel propose to spread the pixel value $I_{RAW}^c(x, y)$ to the closest pixels. However, in a sixth embodiment of the disclosure, we can spread the same pixel value to the K-Nearest Neighbors pixels with respect to a given criterion (nearest neighbors in terms of color, in terms of gradient, etc.). Formally $$W_6(k,l,X,Y) = \chi((k,l) \text{ belongs to the } K\text{-}NN \text{ of } ([X],[Y]))$$

where $\chi(.)$ is the characteristic function (equal to one if the statement is true and equal to zero otherwise) and $[.]$ is the rounding function.

Figure 11:
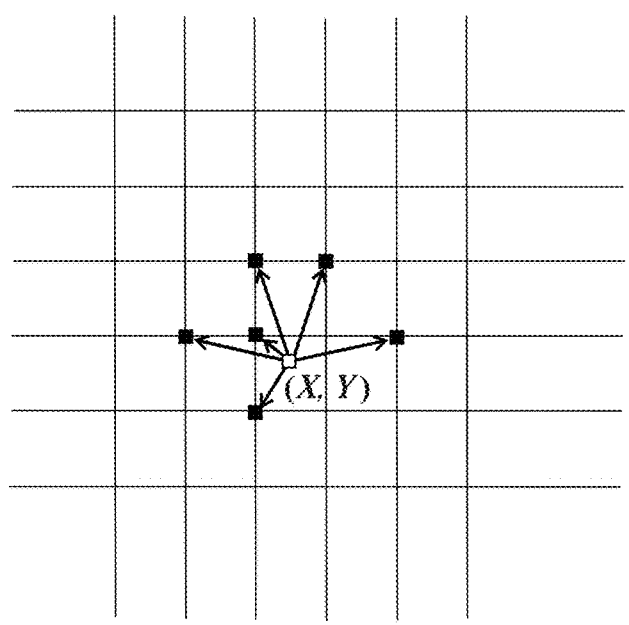
FIG. 11 illustrates how a pixel value of a 4D raw light field data (at coordinates (x, y) is splatted/spread around the projected coordinate (X, Y) to the K-Nearest Neighbors (in this case K=6)

The FIG. 11 presents the value $I_{RAW}^c(x, y)$ that is splatted to the K-Nearest Neighbors. In this example K=6. The K-NN are not necessarily the closest pixels in Euclidian distance but the closest in terms of color, depth or any other criterion.

In a seventh embodiment of the invention, the PSF (Point Spread Function) of the plenoptic camera (or the PSF of the microlens array) can be estimated and considered in the definition of the splat kernel. One possible definition of such a kernel is $$W_7(k,l,X,Y) = PSF(x,y)$$

Note that each color channel has a different PSF, so the definition of the splat kernel can also be adapted depending on the color channel to be splatted.

In an eighth embodiment of the disclosure, it is well known that plenoptic cameras suffer from vignetting and in particular from the vignetting of the microlenses. We propose to penalize during the splatting process, pixels that suffer from vignetting compared to pixels from the center of the microlens. Here we assume that vignetting correction is not always perfect and corrected pixels have a worse signal to noise ratio, so, even with a vignetting correction algorithm, penalizing such pixels is useful. One possible definition of such a splat kernel is to define $$W_8 = \chi(\|(x,y) - (C_x, C_y)\|^2 < \rho)$$

It means that we neglect all pixels placed at the borders of the microlens and we only consider pixels in a circle of radius $\rho$. Another possible definition is given by $$W_9(k, l, X, Y) = \exp\left(-\frac{\|(x, y) - (C_x, C_y)\|^2}{h_8^2}\right)$$

The value $h_8$ is a parameter that can be either inputted by a user or defined as a function of the parameters of the light field device that performed the acquiring of the 4D raw light field data.

Note that a specific kernel taking into account the vignetting of the main lens is also possible.

In a ninth embodiment, the splat kernel can be computed as a product of at least two previously defined splat kernels (e.g. $W_9 = W_1 W_7$ or $W_9 = W_2 W_3 W_6 W_8$).

Figure 12:
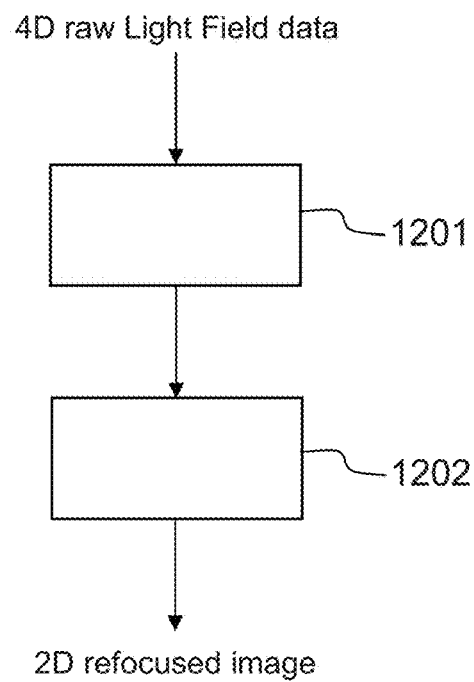
FIG. 12 illustrates some steps of a method for refocusing an image from 4D raw light field data.

FIG. 12 presents a flowchart according to one embodiment of the invention.

More precisely, the FIG. 12 illustrates some steps of a method for refocusing an image from acquired 4D raw light field data.

In a step referenced 1201, an electronic device receives a 4D raw light field data. Moreover, some parameters are obtained by said electronic device that defines a focal plane on which a focus has to be done. In one embodiment, these parameters can be obtained via the interactions of a user with a user interface (for selecting for example an object on which a focus has to be done). These parameters can also comprise a size of a refocused image.

Then, in a step referenced 1202, the electronic device processes all the pixels coordinates of the 4D raw light field data in order to determine all the coordinates of the projected pixels (as projected in FIG. 6 for example). Then, by using a regular grid (a finite grid defined on N×N) for defining coordinates in a 2D refocused image, a process of determining pixel values in this regular grid is done. In order to determine a pixel value at coordinates $(k, l) \in N^2$, the processed previously described can be executed.

In a variant not all the pixels of the 4D raw light field data are "projected". Indeed, pixels at the edge of the microlens images are discarded and are therefore not projected and used in the refocusing process.

In a variant, the projection and the update of the pixels' values in the 2D refocused image are done simultaneously.

At the end of the step 1202, a 2D refocused image is obtained. This 2D refocused image can then be displayed by a display device.

Figure 13:
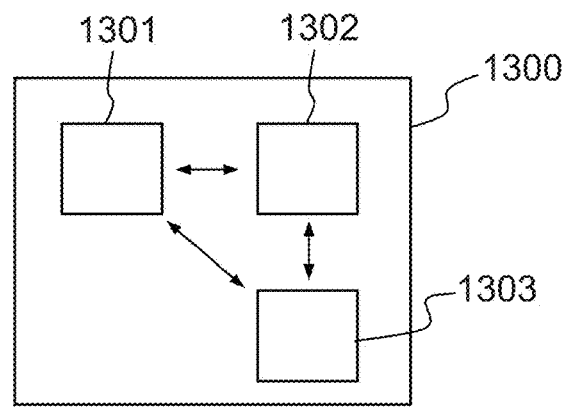
FIG. 13 presents an example of device that can be used to perform one or several steps of methods disclosed in the present document.

FIG. 13 presents an example of device that can be used to perform one or several steps of methods disclosed in the present document.

Such device referenced 1300 comprises a computing unit (for example a CPU, for "Central Processing Unit"), referenced 1301, and one or more memory units (for example a RAM (for "Random Access Memory") block in which intermediate results can be stored temporarily during the execution of instructions a computer program, or a ROM block in which, among other things, computer programs are stored, or an EEPROM ("Electrically-Erasable Programmable Read-Only Memory") block, or a flash block) referenced 1302. Computer programs are made of instructions that can be executed by the computing unit. Such device 1300 can also comprise a dedicated unit, referenced 1303, constituting an input-output interface to allow the device 1300 to communicate with other devices. In particular, this dedicated unit 1303 can be connected with an antenna (in order to perform communication without contacts), or with serial ports (to carry communications "contact"). It should be noted that the arrows in FIG. 13 signify that the linked unit can exchange data through buses for example together.

In an alternative embodiment, some or all of the steps of the method previously described, can be implemented in hardware in a programmable FPGA ("Field Programmable Gate Array") component or ASIC ("Application-Specific Integrated Circuit") component.

In an alternative embodiment, some or all of the steps of the method previously described, can be executed on an electronic device comprising memory units and processing units as the one disclosed in the FIG. 13.

In one embodiment of the disclosure, the electronic device depicted in FIG. 13 can be comprised in a camera device that is configure to capture images (i.e. a sampling of a light field). These images are stored on one or more memory units. Hence, these images can be viewed as bit stream data (i.e. a sequence of bits). Obviously, a bit stream can also be converted on byte stream and vice versa.

The invention claimed is:

1. A method for obtaining a refocused image from 4D raw light field data for a given focus plane value g, the method being executed by an electronic device, and wherein the method comprises determining at least one pixel value, for at least one color component, of said refocused image at coordinates $(k, l) \in N^2$ without using a demosaicing process on said 4D raw light field data, said determining comprising:

obtaining at least one projected pixel value with coordinates comprised in a neighborhood of said coordinates (k, l), for said at least one color component;

weighting said at least one projected pixel value based on a function, said weighting outputting a weighted value;

updating said at least one pixel value, for said at least one color component, of said refocused image at coordinates (k, l) with said weighted value.

2. The method for obtaining according to claim 1, wherein said at least one projected pixel value has coordinates (X, Y), and said function is defined as being $$W_1(k, l, X, Y) = \exp\left(-\frac{\|(k, l) - (X, Y)\|^2}{h_1^2}\right),$$

where $h_1$ corresponds to a value that belongs to R, and function $\|.\|$ is a norm function.

3. The method for obtaining according to claim 1, wherein said at least one projected pixel value has coordinates (X, Y), and said function is defined as being $$W_2(k, l, X, Y) = \exp\left(-\frac{(g - g_{real}(X, Y))^2}{h_2^2}\right),$$

where $h_2$ corresponds to a value that belongs to R, R, and value of $g_{real}(X, Y)$ corresponds to the real distance in a scene associated with said 4D raw light field data from a light field acquisition device that acquired said 4D raw light field data.

4. The method for obtaining according to claim 1, wherein said at least one projected pixel value has coordinates (X, Y), and said function is defined as being $$W_3(k, l, X, Y) = \exp\left(-\frac{(a(k-X) + b(l-Y))^2}{h_3^2}\right)\exp\left(-\frac{(c(k-X) + d(l-Y))^2}{h_3'^2}\right),$$

where $h_3$ and $h_3'$ correspond to a values that belong to R, and values a, b, c and d correspond to smoothing values determined according to tensor structure of said refocused image.

5. The method for obtaining according to claim 1, wherein said at least one projected pixel value has coordinates (X, Y), and said function is defined as being $W_6(k, l, X, Y) = \chi((k, l)$ belongs to the K-Nearest Neighbors pixels of ([X], [Y])), where $\chi()$ is the characteristic function which is equal to one if the statement is true and equal to zero otherwise, [.] is the rounding function, and K is an integer greater or equal to 2.

6. The method for obtaining according to claim 1, wherein said at least one projected pixel value has coordinates (X, Y)=$(s[g(x-C_x)+C_x], s[g(y-C_y)+C_y])$ where, s defines the image size of the 2D refocused image, coordinates (x, y)

correspond to coordinates of a pixel in said 4D raw light field data, coordinates ($C_x$, $C_y$) correspond to coordinates of a center of a micro-image to which pixel at coordinates (x, y) belongs to, and said function is defined as being $W_7(k, l, X, Y) = PSF(x, y)$, where function PSF is an estimation of the Point Spread Function of a plenoptic camera.

7. The method for obtaining according to claim 1, wherein said at least one projected pixel value has coordinates (X, Y)=$(s[g(x-C_x)+C_x], s[g(y-C_y)+C_y])$ where, s defines the image size of the 2D refocused image, coordinates (x, y) correspond to coordinates of a pixel in said 4D raw light field data, coordinates ($C_x$, $C_y$) correspond to coordinates of a center of a micro-image to which pixel at coordinates (x, y) belongs to, and said function is defined as being $W_8 = \chi(\|(x, y)-(C_x, C_y)\|^2 < \rho)$, where $\chi(\ )$ is the characteristic function which is equal to one if the statement is true and equal to zero otherwise, $\rho$ is a threshold value, and function$\|.\|$ is a norm function.

8. The method for obtaining according to claim 1, wherein said at least one projected pixel value has coordinates (X, Y)=$(s[g(x-C_x)+C_x], s[g(y-C_y)+C_y])$ where, s defines the image size of the 2D refocused image, coordinates (x, y) correspond to coordinates of a pixel in said 4D raw light field data, coordinates ($C_x$, $C_y$) correspond to coordinates of a center of a micro-image to which pixel at coordinates (x, y) belongs to, and said function is defined as being $$W_9(k, l, X, Y) = \exp\left(-\frac{\|(x, y)-(C_x, C_y)\|^2}{h_8^2}\right),$$

where $h_8$ corresponds to a value that belongs to R, and function$\|.\|$ is a norm function.

9. The method for obtaining according to claim 2, wherein said at least one projected pixel value has coordinates (X, Y)=$(s[g(x-C_x)+C_x], s[g(y-C_y)+C_y])$, where, s defines the image size of the 2D refocused image, coordinates (x, y) correspond to coordinates of a pixel in said 4D raw light field data, coordinates ($C_x$, $C_y$) corresponds to coordinates of a center of a micro-image to which pixel at coordinates (x, y) belongs to, and said function is defined as being equal to $$W_4(k, l, X, Y) = \frac{1}{|S(x, y) - S_{max}|} W_i$$

with $i \neq 4$, where S(x, y) is a measure of sharpness of the microlens to which (x, y) belong and $S_{max}$ corresponds to a maximum sharpness value over all microlenses of said 4D raw light field data.

10. The method for obtaining according to claim 2, wherein said function is defined as being separable.

11. The method for obtaining according to claim 2, wherein said function is defined as being a product of $$W_1(k, l, X, Y) = \exp\left(-\frac{\|(k, l)-(X, Y)\|^2}{h_1^2}\right),$$

where $h_1$ corresponds to a value that belongs to R, function$\|.\|$ is a norm function, with another function.

12. The method for obtaining according to claim 1, wherein said updating comprises adding said weighted value to said at least one pixel value.

13. A computer-readable and non-transient storage medium storing a computer program comprising a set of computer-executable instructions to implement a method for processing 4D raw light field data when the instructions are executed by a computer, wherein the instructions comprise instructions, which when executed, configure the computer to perform a method for obtaining a refocused image from 4D raw light field data for a given focus plane value g, the method being executed by an electronic device, and wherein the method comprises determining at least one pixel value, for at least one color component, of said refocused image at coordinates (k, l)$\in N^2$ without using a demosaicing process on said 4D raw light field data, said determining comprising:

obtaining at least one projected pixel value with coordinates comprised in a neighborhood of said coordinates (k, l), for said at least one color component;

weighting said at least one projected pixel value based on a function, said weighting outputting a weighted value;

updating said at least one pixel value, for said at least one color component, of said refocused image at coordinates (k, l) with said weighted value.

14. An electronic device for obtaining a refocused image from 4D raw light field data for a given focus plane value g, wherein the electronic device comprises a circuit configured to determine at least one pixel value, for at least one color component, of said refocused image at coordinates (k, l)$\in N^2$ without using a demosaicing process on said 4D raw light field data, said circuit comprising:

an obtaining circuit configured to obtain at least one projected pixel value with coordinates comprised in a neighborhood of said coordinates (k, l), for said at least one color component;

a weighting circuit configured to weight said at least one projected pixel value based on a function, said weighting circuit outputting a weighted value;

an updating circuit configured to update said at least one pixel value, for said at least one color component, of said refocused image at coordinates (k, l) with said weighted value.

15. The electronic device according to claim 14, wherein said at least one projected pixel value has coordinates (X, Y), and said function is defined as being $$W_1(k, l, X, Y) = \exp\left(-\frac{\|(k, l)-(X, Y)\|^2}{h_1^2}\right),$$

where $h_1$ corresponds to a value that belongs to R, and function$\|.\|$ is a norm function.

* * * * *